United States Patent
Smith

(10) Patent No.: US 9,381,779 B2
(45) Date of Patent: Jul. 5, 2016

(54) SYSTEM AND METHOD FOR THERMAL MITIGATION FOR TIRE PRESSURE MEASUREMENT ELECTRONICS

(75) Inventor: Gary Thomas Smith, San Juan Capistrano, CA (US)

(73) Assignee: MEGGITT (ORANGE COUNTY), INC., Irvine, CA (US)

(*) Notice: Subject to any disclaimer, the term of this patent is extended or adjusted under 35 U.S.C. 154(b) by 334 days.

(21) Appl. No.: 13/544,186

(22) Filed: Jul. 9, 2012

(65) Prior Publication Data

US 2014/0010264 A1 Jan. 9, 2014

(51) Int. Cl.
G01K 13/00 (2006.01)
B60C 23/04 (2006.01)
G01K 1/12 (2006.01)
G01K 13/08 (2006.01)

(52) U.S. Cl.
CPC ............. *B60C 23/0498* (2013.01); *G01K 1/12* (2013.01); *G01K 13/08* (2013.01)

(58) Field of Classification Search
USPC .................................. 374/143, 153, 141, 208
See application file for complete search history.

(56) References Cited

U.S. PATENT DOCUMENTS

| | | | | |
|---|---|---|---|---|
| 4,435,625 A | * | 3/1984 | Buchschmid et al. | 200/61.22 |
| 4,630,471 A | * | 12/1986 | Kamprath et al. | 73/146.5 |
| 4,701,742 A | * | 10/1987 | Ruehr | 200/61.25 |
| 4,723,445 A | * | 2/1988 | Ripley et al. | 73/146.3 |
| 4,768,375 A | * | 9/1988 | Eckardt et al. | 73/146.5 |
| 4,793,277 A | * | 12/1988 | Haas et al. | 116/34 R |
| 5,071,259 A | | 12/1991 | Metzger et al. | |
| 5,193,387 A | * | 3/1993 | Hodate | 73/146.5 |
| 5,401,079 A | | 3/1995 | Rooney | |
| 5,452,608 A | * | 9/1995 | Green | 73/146.8 |
| 5,844,130 A | * | 12/1998 | Hilgart et al. | 73/146.5 |
| 6,829,925 B2 | * | 12/2004 | Nespo et al. | 73/146 |
| 6,993,962 B1 | * | 2/2006 | Ko | 73/146.5 |
| 7,397,353 B2 | * | 7/2008 | Myhre et al. | 340/448 |
| 7,490,793 B2 | * | 2/2009 | Mackness | 244/100 R |
| 2004/0075022 A1 | | 4/2004 | MacKness | |
| 2011/0056285 A1 | * | 3/2011 | Finefrock | 73/146.5 |
| 2011/0089655 A1 | | 4/2011 | McCann | |
| 2011/0313623 A1 | | 12/2011 | Greer | |
| 2014/0010265 A1 | * | 1/2014 | Peng | 374/143 |

OTHER PUBLICATIONS

Notification of Transmittal of the International Search Report and the Written Opinion of the International Searching Authority, or the Declaration, dated Dec. 3, 2013.

\* cited by examiner

*Primary Examiner* — Mirellys Jagan

(57) ABSTRACT

A thermal pressure measurement assembly coupled to a rim of an aircraft wheel. A housing is configured to be fastened to a wheel face. An electronics enclosure is positioned in the housing. Electronics are positioned in the electronics enclosure and configured to process a signal received from a remote sensor that measures tire pressure and temperature. Internal insulation is positioned in an interior of the housing. The internal insulation is configured to reduce the temperature of the electronics sufficiently to permit use of low temperature electronics rated to 125 degrees C.

22 Claims, 12 Drawing Sheets

SYSTEM AND METHOD FOR THERMAL MITIGATION FOR TIRE PRESSURE MEASUREMENT ELECTRONICS

BACKGROUND

1. Field of the Invention

The present invention relates generally to systems for thermal mitigation for tire pressure measurement electronics, and more particularly to tire pressure measurement systems (hereafter "TPMS") configured to be mounted on a wheel of a vehicle, that uses relatively low cost electronics.

2. Description of the Related Art

Aircraft brake and wheel temperatures are continually increasing. There are many intermittent, peak temperatures seen by the wheel mounted TPMS electronics housing, and it associated internal electrical components.

Large aircraft generate a great deal of heat in their wheels during landing, taxing and taking off. This is due to conduction of heat from the brakes. Because the rubber tire is a poor thermal conductor the heat may build up in the wheel more rapidly than it can be dissipated, especially on aircraft executing repeated take offs and landings, abnormally long taxi distances or aborted take-offs. If the pilot is unaware of the resultant ever increasing temperature it may cause a hazardous tire burst. To prevent this, it is often necessary to apply an obligatory safe cooling period between flights and this can become a limiting factor in the turnaround time of the aircraft.

The actual tire temperature depends on many factors such as, number of previous flights, atmospheric temperature, aircraft weight, taxi distance and use of brakes. A safe obligatory cooling period cannot generally take all of these factors into account and is often unnecessarily long.

Pressure testing devices for the tires of aircraft are well known. One form comprises a mechanical gauge similar to that first invented over one hundred years ago. More modern devices use an electromechanical sensor.

However, with such devices it is only feasible to test the pressure of the tires when they are at a known reference temperature, and this typically means that the tire must be at or close to the ambient temperature, otherwise the hot gas within the tire will be at a greater pressure than the corresponding gas when cold, and the temperature-induced variation will render the pressure reading unreliable.

In the United States, for example, the Federal Aviation Authority (F.A.A.) has expressed the wish that tire pressures be tested every day, but the airlines have indicated that this cannot be achieved in practice because aircraft are often in continual operation for up to three weeks at a time, and the aircraft is not on the ground within this period for long enough for the tires to cool sufficiently for reliable testing to take place.

Because of the high temperatures, expensive and exotic high temperature electronics are may be required.

SUMMARY OF THE INVENTION

An object of the present invention is to provide improved systems for thermal mitigation for tire pressure measurement electronics.

Another object of the present invention is to provide improved systems for TPMS configured to be mounted on a wheel of a vehicle, that uses low cost electronics.

A further object of the present invention is to provide a TPMS configured/coupled to the rim of an aircraft wheel.

Still another object of the present invention is to provide a TPMS with internal insulation positioned in an interior of a housing.

Yet another object of the present invention is to provide a TPMS with internal insulation configured to reduce a temperature of electronics sufficiently to permit use of electronics rated and operable to 125 degrees C.

Still another object of the present invention is to provide a TPMS with insulation configured to provide that an interior temperature of and enclosure for electronics does not exceed 125 degrees C.

These and other objects of the present invention are achieved in, a thermal pressure measurement assembly coupled to a rim of an aircraft wheel. A housing is configured to be fastened to a wheel face. An electronics enclosure is positioned in the housing. Electronics are positioned in the electronics enclosure and configured to process a signal received from a remote sensor that measures tire pressure and temperature. Internal insulation is positioned in an interior of the housing. The internal insulation is configured to reduce the temperature of the electronics sufficiently to permit use of low temperature electronics rated to 125 degrees C.

DETAILED DESCRIPTION OF THE PREFERRED EMBODIMENTS

Figure 1:
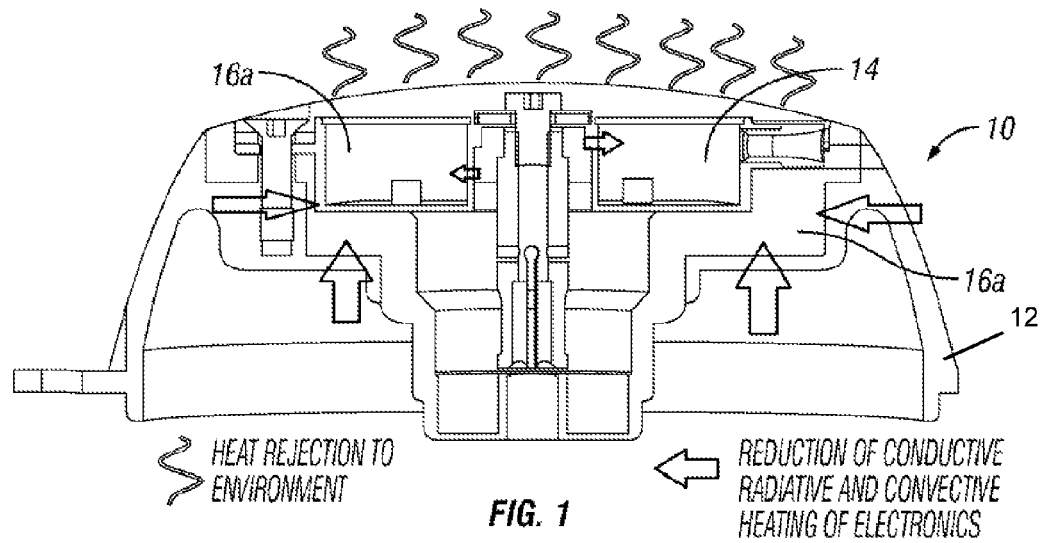
FIG. 1 illustrates a cross-sectional view of one embodiment of a TPMS of the present invention.
Figure 2:
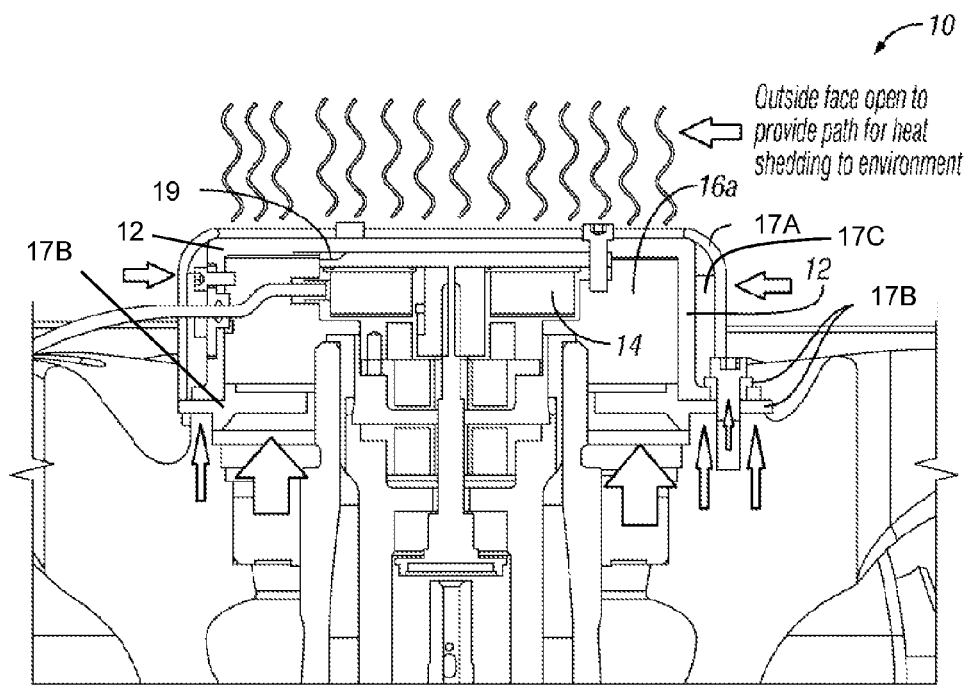
FIG. 2 illustrates a cross-sectional view of another embodiment of a TPMS of the present invention.

FIGS. 1 and 2 illustrate a TPMS 10 of the present invention illustrating an interior of a housing, also known as the hubcap 12, with the enclosed electronic components, generally denoted as 14.

In FIG. 1, internal insulation 16a is used to provide for thermal insulation of internal low cost electronics 14 used for tire pressure and/or temperature measurement and monitoring. The heat dissipation is illustrated.

In FIG. 2, external insulation is provided that can include a thermally insulating shroud 17A, thermal insulating spacer 17B an air or insulating filler 17C and a thermally conductive spacer 19.

In one embodiment, the present invention provides a TPMS 10 that is configured to be mounted on a wheel or rim 18 of an aircraft. The TPMS 10 includes the housing with a main body generally denoted as 12, sometimes known as a hubcap, for the electronics 14. The hubcap 12 can be attached by a plurality of screws 20 or equivalent structures to a wheel hub or rim 18 of a tire and cover all or a portion of an axial opening of the wheel hub. The TPMS 10 includes electronics 14 in an enclosure 24 that process a signal received from a sensor 26 that measures tire pressure and or temperature. In various embodiments, the sensor 26 can measure other parameters. As a non-limiting example, the pressure sensor 26 can be based on piezoresistive or piezoelectric technology, including but not limited to those disclosed in U.S. Pat. No. 5,996,419, U.S. Publication No. 2002/0073783, incorporated herein fully by reference.

Figure 3:
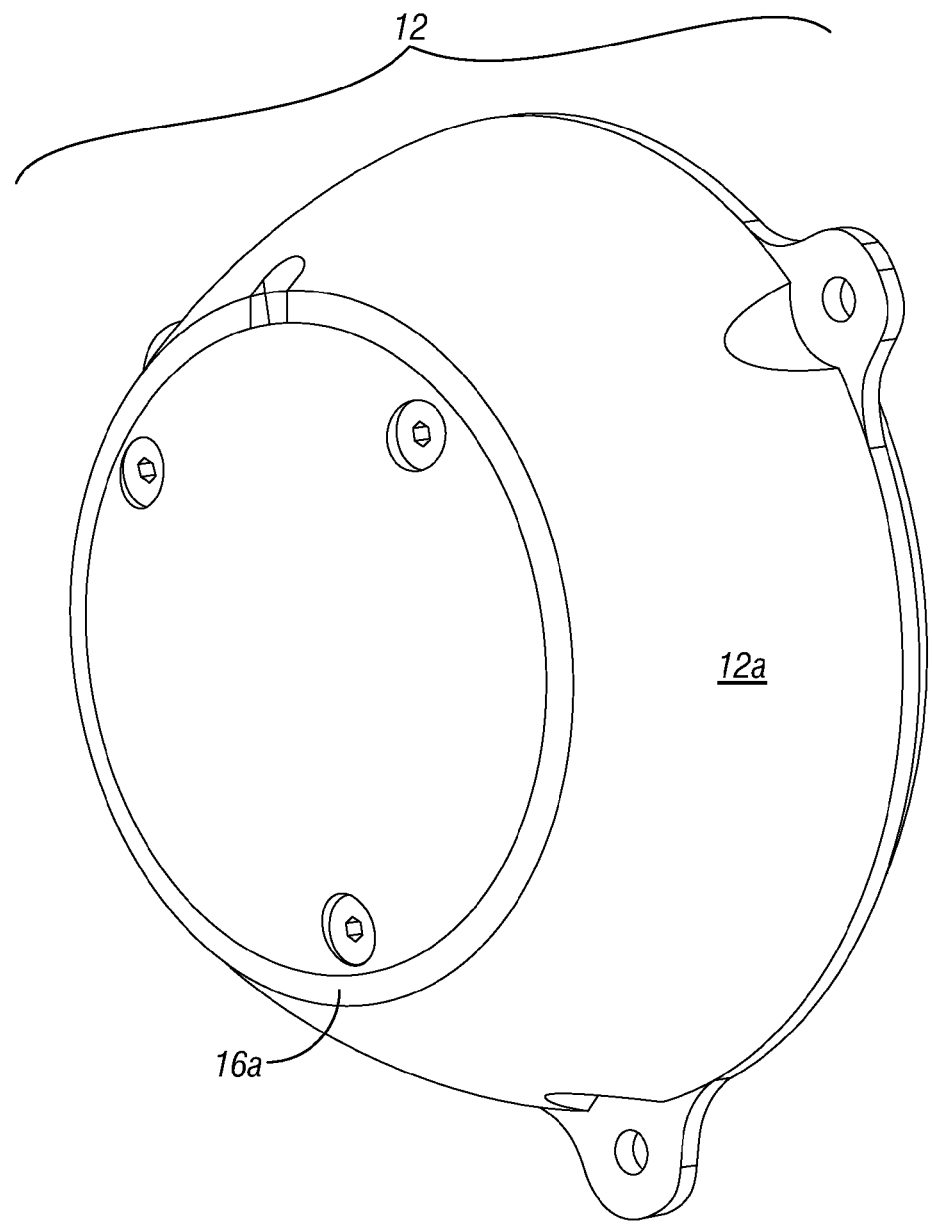
FIG. 3 illustrates an embodiment of the present invention where a hubcap includes an internal insulator positioned at a top cap of the hubcap main body.
Figure 4:
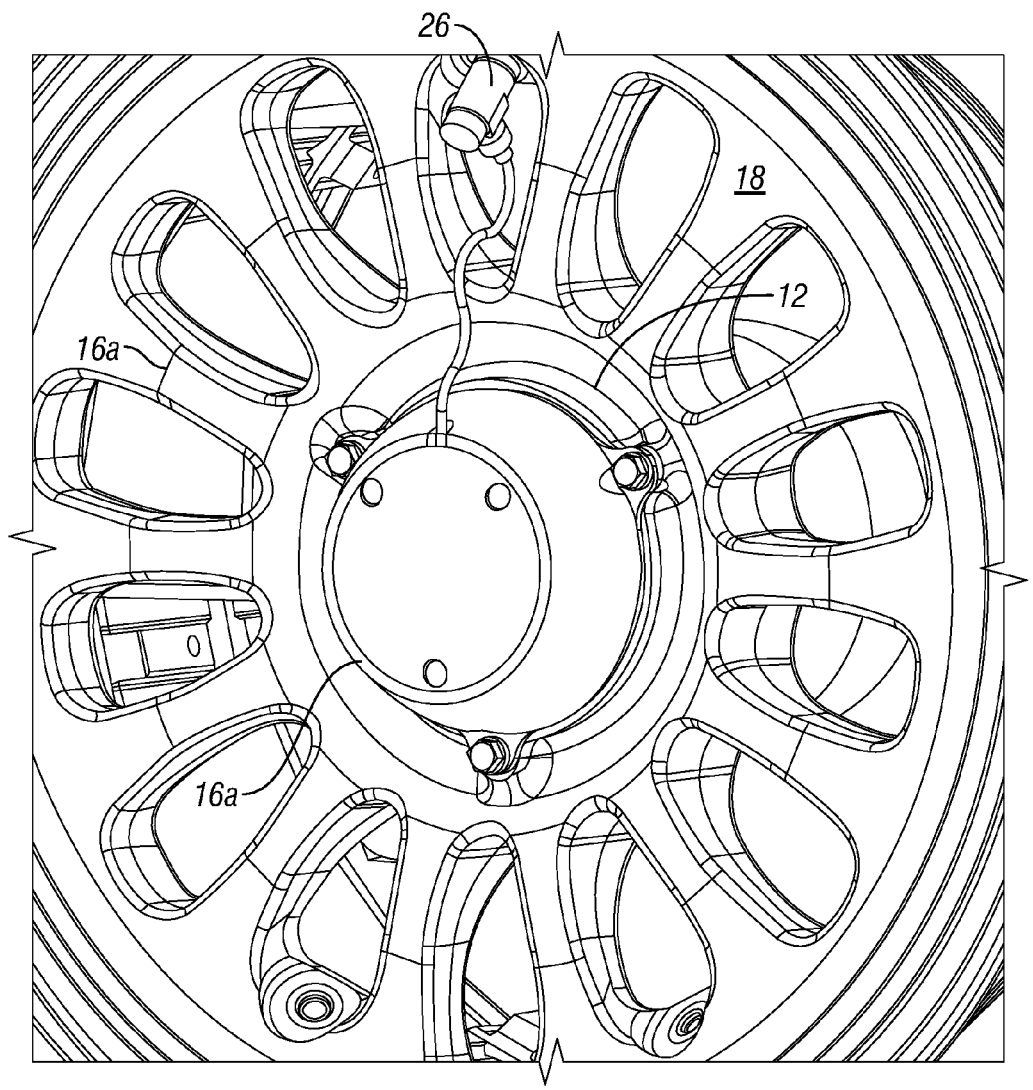
FIG. 4 illustrates an embodiment of the present invention with a pressure sensor coupled to a rim of a tire.

In the FIG. 3 embodiment, the hubcap 12 includes an internal insulator 16a positioned at a top cap 12 of the hubcap 12a main body. As illustrated, the internal insulator 16a is in the form of a ring, but other geometric configurations are suitable. The insulator 16a may be positioned at any location within the assembly where it will limit heat flow into the electronics 14. In this embodiment, there is no external insulator 16b between the hubcap 12 and the wheel of the vehicle. FIG. 4 shows that the pressure sensor 26 is coupled to a rim 18 of the tire and is electrical coupled to the electronics 14 and the electronics enclosure 24 positioned internally in the hubcap 12. The insulation is of sufficient isolative ability and positioned to prevent the interior of the electronics enclosure 24 from exceeding 125 degrees C. or less.

Figure 5:
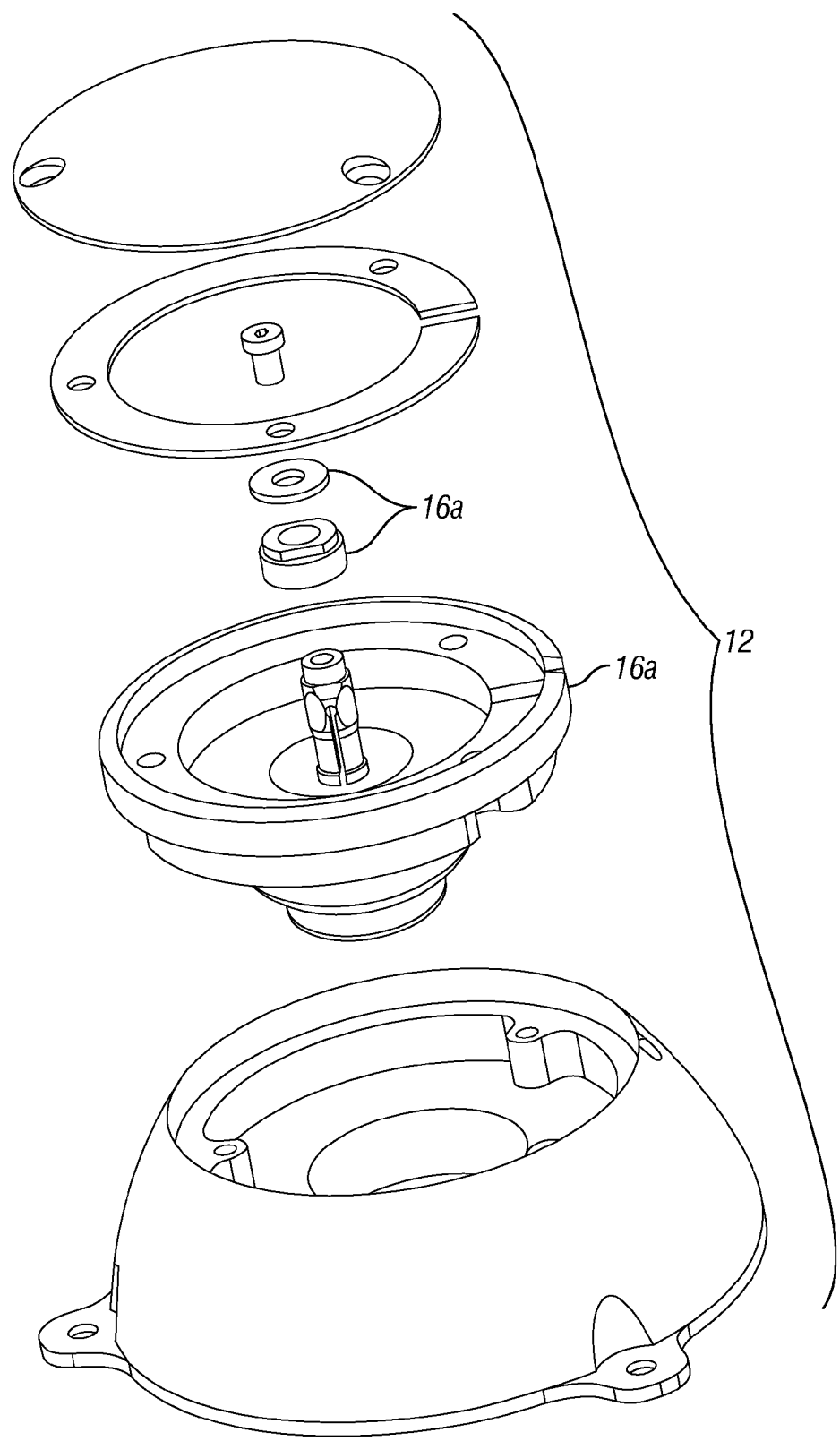
FIG. 5 illustrates an embodiment of the present invention with one embodiment of a top cap of the hubcap.
Figure 9:
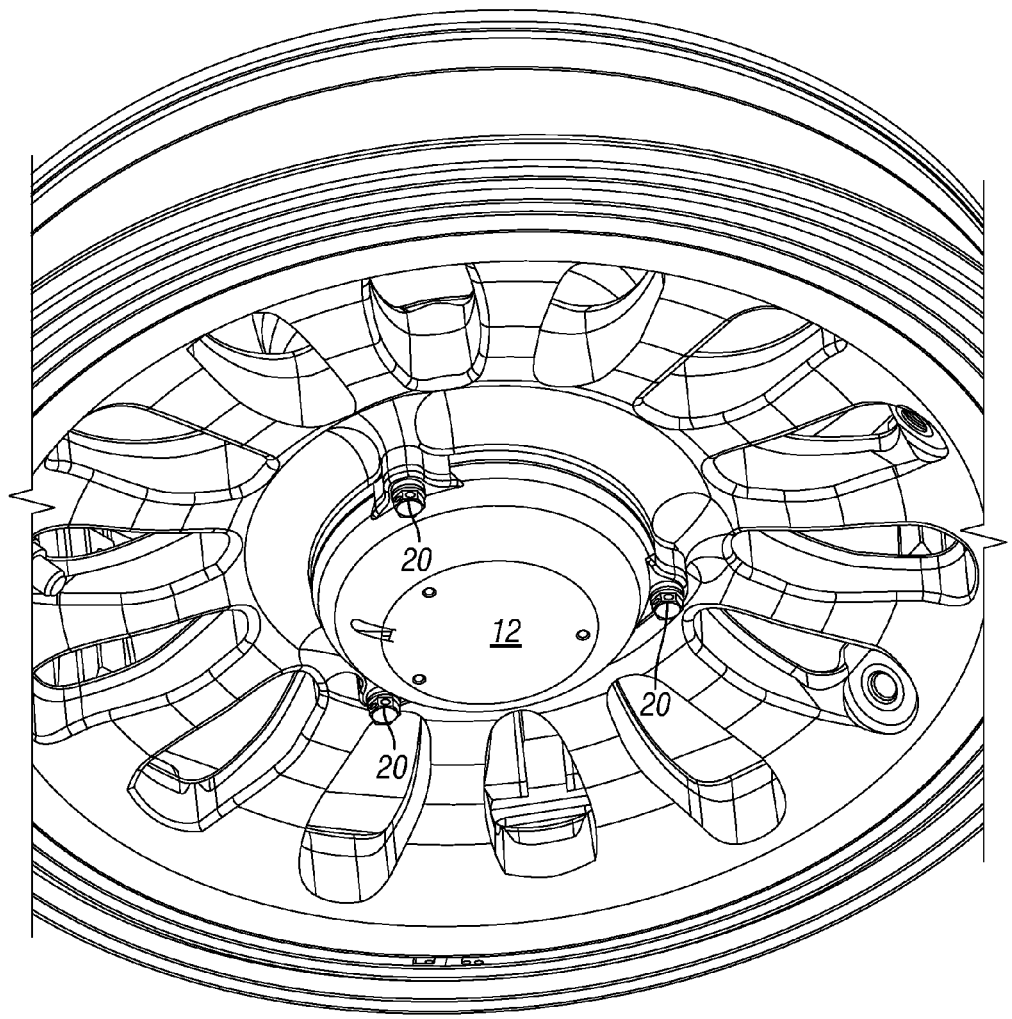
FIG. 9 illustrates the hubcap attached by three screws or equivalent structures that hold it onto a wheel hub of a vehicle.

FIG. 5 illustrates the hubcap 12, with the top cap of the hubcap 12, from the FIG. 9 embodiment. Again, although the internal insulator 16a is shown as being in a ring configuration, it can be in a variety of different geometric configurations, and can also be positioned at different surfaces; in the case noted above the insulator 16a may be positioned at any location within the assembly where it will limit heat flow into the electronics 14.

The electronics 14 are subject to application of elevated temperatures when there are brakes on the wheel. The system and methods of the present invention retard a transfer of heat by various transmission modes, including but not limited to, radiation, conduction and convection, from the wheel, and the brakes, into the electronics 14 present in the TPMS 10. This enhances the ability of standard electronics 14 to function efficiently. High temperature electronics 14, which can operate efficiently at greater than 125 degrees C., are expensive and customized. Typically low temperature electronics 14, such as those less than 125 degrees C., are more widely available inexpensive commercial off-the-shelf (COTS) commodities. With the present invention, a large cost saving is achieved using low temperature electronics 14, that can withstand temperatures no great than 125 degrees C., 120 degrees C., and 115 degrees C. Thus, allowing the application of the technology to a much wider market.

Figure 6:
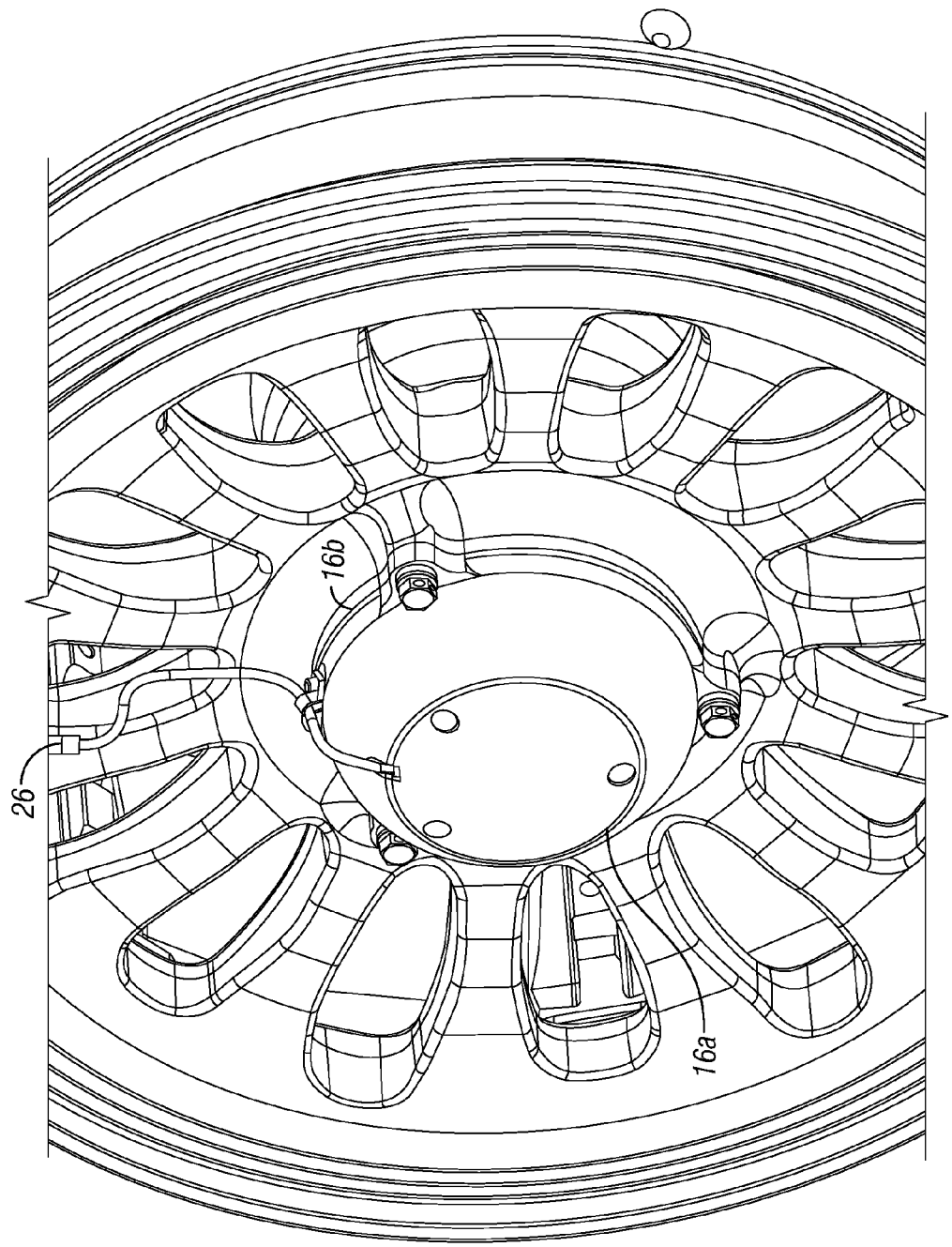
FIG. 6 illustrates an embodiment of the present invention with internal and external insulators.

In the FIG. 6 embodiment, internal 16(a) and external insulator(s) 16b are provided. Also illustrated is a mounted sensor 26 that is coupled to the electronics 14 via a conduit. The external insulation can reside between wheel hub and the hubcap 12. The internal insulation can be in the form of a washer like flat ring to limit heat flow in one direction, or a profiled 3 dimensional structure to limit heat flow in all directions the sensor 26 can be a pressure sensor, including but not limited to a piezoelectric, piezoresistive or MEMS pressure sensor.

Figure 7:
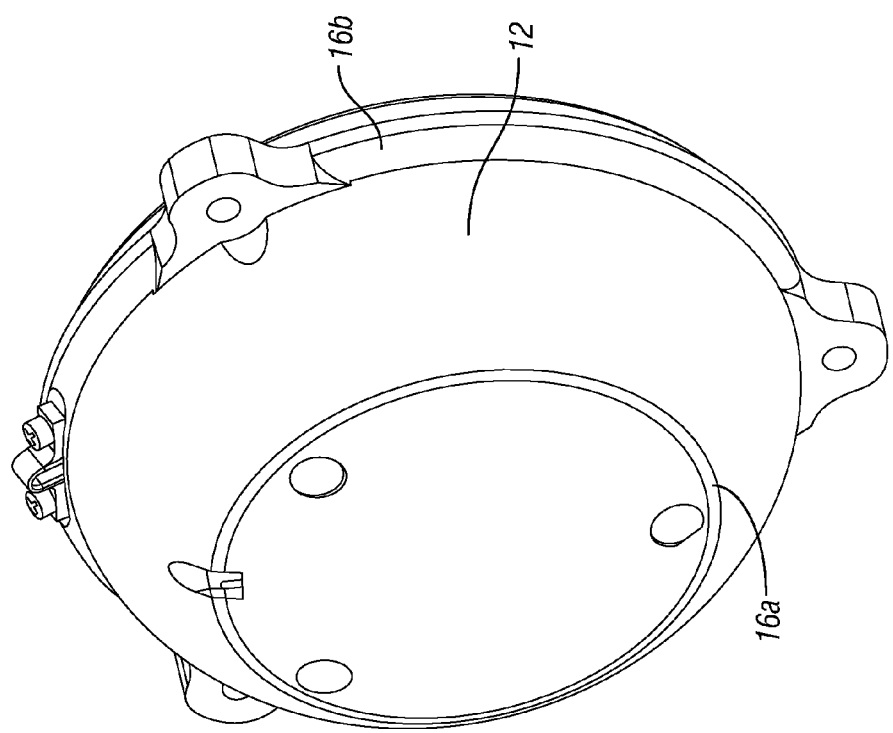
FIG. 7 illustrates a perspective view of FIG. 6 embodiment.

FIG. 7 is a perspective view of the hubcap main body 12 of FIG. 6 including both the internal 16(a) and external insulator 16b.

Figure 8:
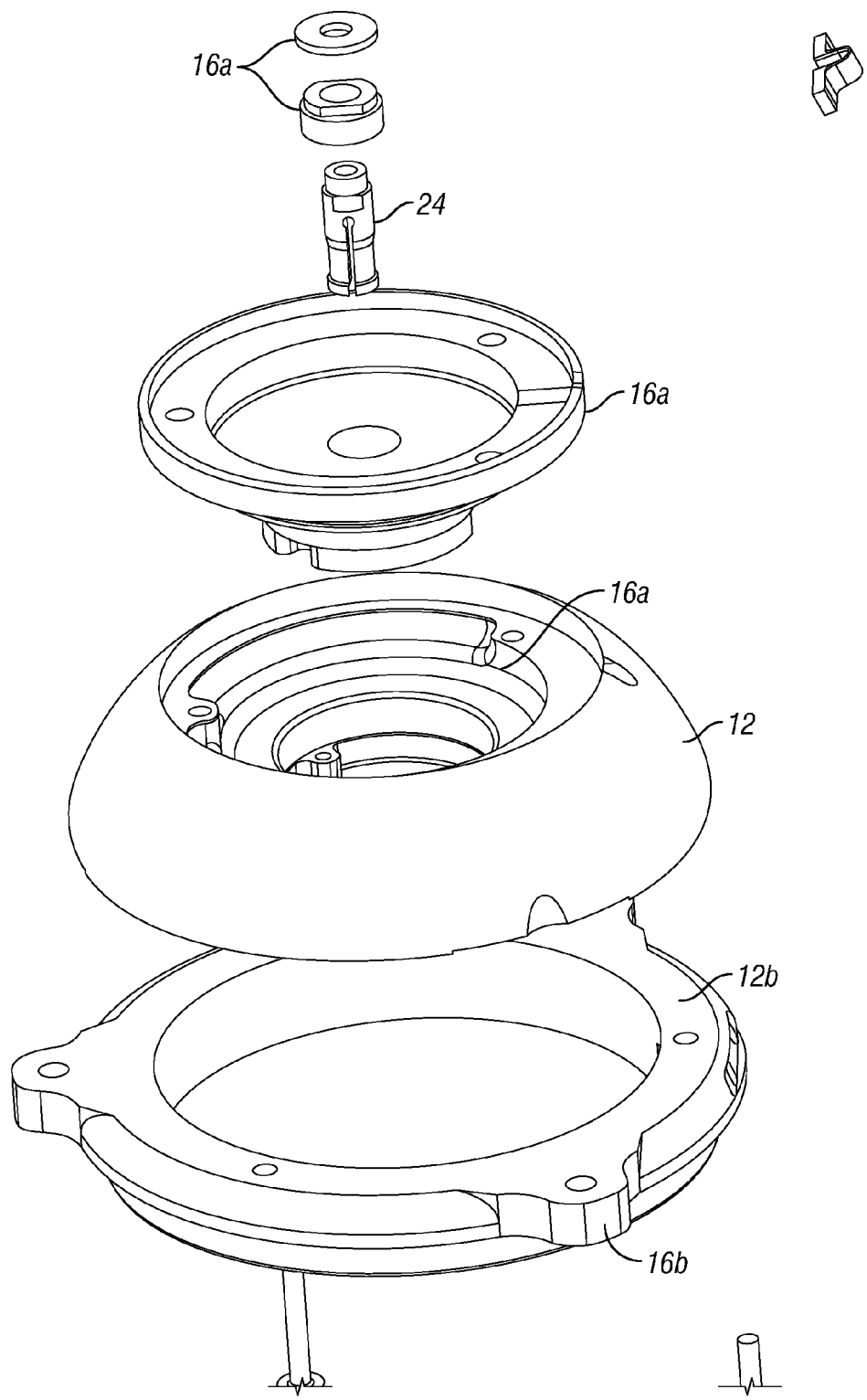
FIG. 8 illustrates an embodiment of the present invention with specific insulators.

Referring now to the exploded diagram of FIG. 8, internal and external insulators 16a and 16b are provided on the same lower hubcap body 12b. This provides a number of advantages. The primary path of heat flow from the wheel hub into the electronics enclosure 24 is limited, secondary heat transfer from the housing into the electronics 14 is also limited. The external insulator 16b is coupled to the hubcap main body 12, via fasteners which can be thermal isolated via insulators 16b, as discussed above. The hubcap main body 12 body element includes an internal insulator 16a. The purpose of the hubcap main body 12 is to position and support a rotating coil element on the wheel that interfaces with a mating stationary coil element in the axle, as well as to provide a protective enclosure 24 for the electronics 14. Wheel speed transducer coupling insulators 16a and/or 16b are also provided that isolate the electronics 14 from thermal conducting elements. As shown in FIG. 8, internal insulators 16a are provided: (i) an external insulator 16a ring, (ii) collet insulators 16a and (iii) and a profiled internal insulator 16a in the hubcap main body 12.

Figure 10:
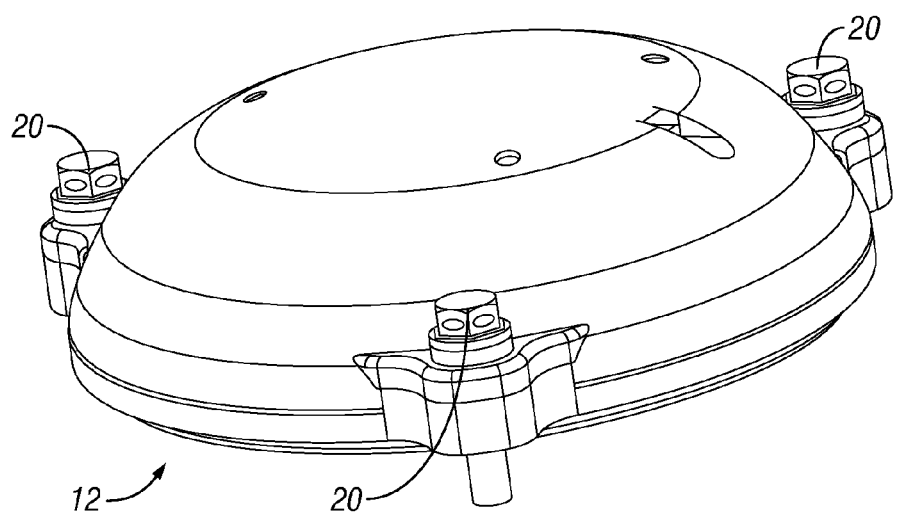
FIG. 10 illustrates the hubcap separated from the wheel of FIG. 9.

Referring now to FIG. 9, the hubcap 12 is shown as being attached by three screws 20, or equivalent structures, that hold the hubcap 12 onto a wheel hub of a vehicle. The number of fasteners is arbitrary and dependent on individual application geometry. The hubcap 12 covers the axial opening or the outboard face of the wheel. An external thermal insulation is provided at an external surface of the hubcap 12 that interfaces with the wheel. In this embodiment, the external thermal insulation is positioned distally from the electronics 14 (not shown) positioned in an interior of the hubcap 12. FIG. 10 illustrates the hubcap 12 separated from the wheel of FIG. 9.

Figure 11:
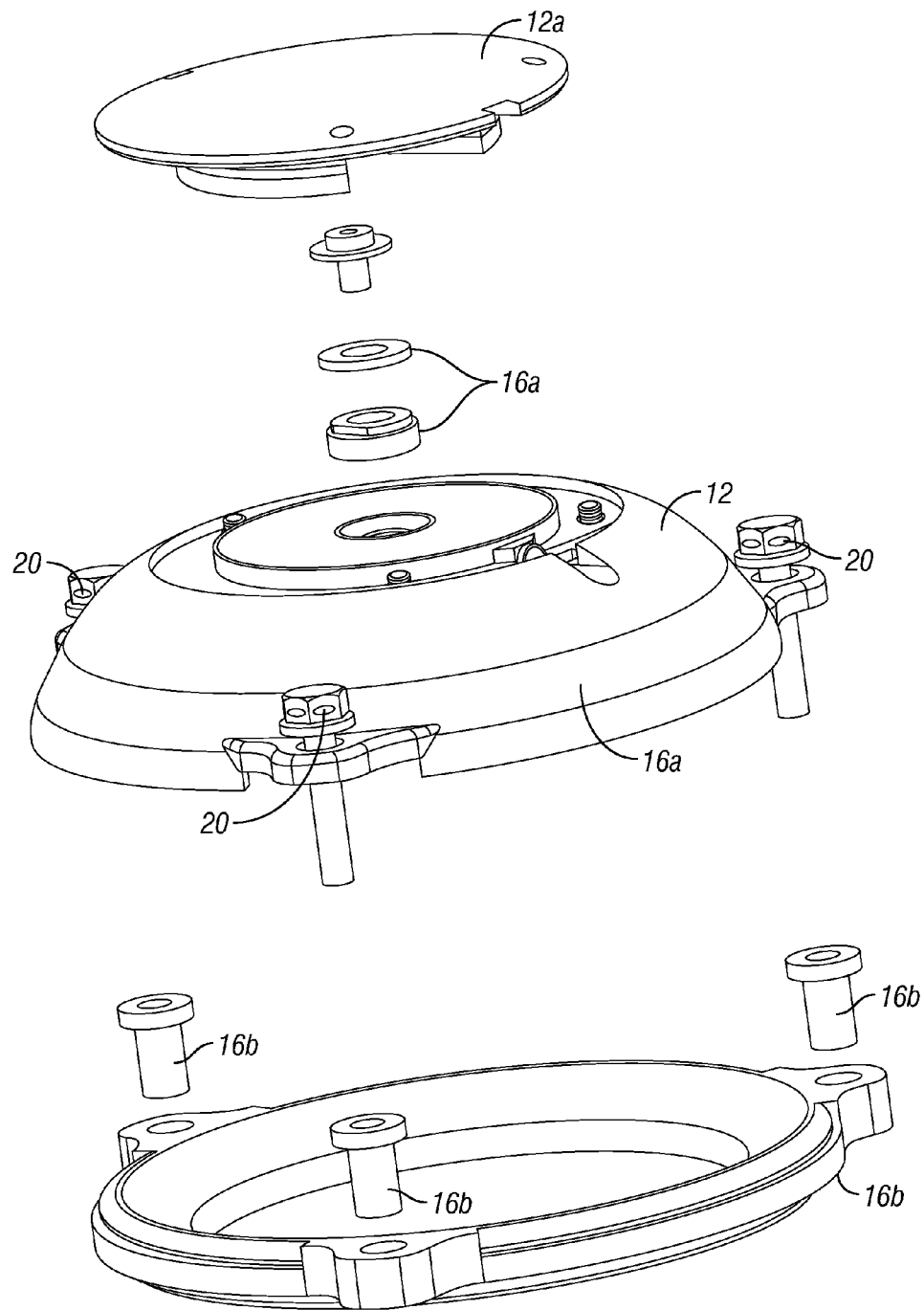
FIG. 11 is an exploded view of the hubcap with both internal and external insulation.

FIG. 11 is an exploded view of the hubcap 12 with both internal and external insulation. The hubcap cap 12a is coupled to the hubcap main body 12. Internal insulators 16a are provided. In one embodiment, illustrated in Figure 11the internal insulators 16a include an insulating sleeve 16a and insulating washer 16a that isolate the metal collet 16 from the electronics enclosure 24, which in FIG. 11 is not shown. The external insulator 16b includes a plurality of fastener insulators 16b. The fasteners are coupled to the hubcap main body 12. In one embodiment, the fasteners are heat conductors, including but not limited to metallic screws 20, that couple the hubcap main body 12 to the external insulator 16b. External insulation is provided in a relationship to the fasteners to reduce and/or eliminate heat transfer from the wheel through the fasteners, into the hubcap 12 and into the electronics 14. In the FIG. 11 embodiment, external screw insulators 16b are provided.

Figure 12:
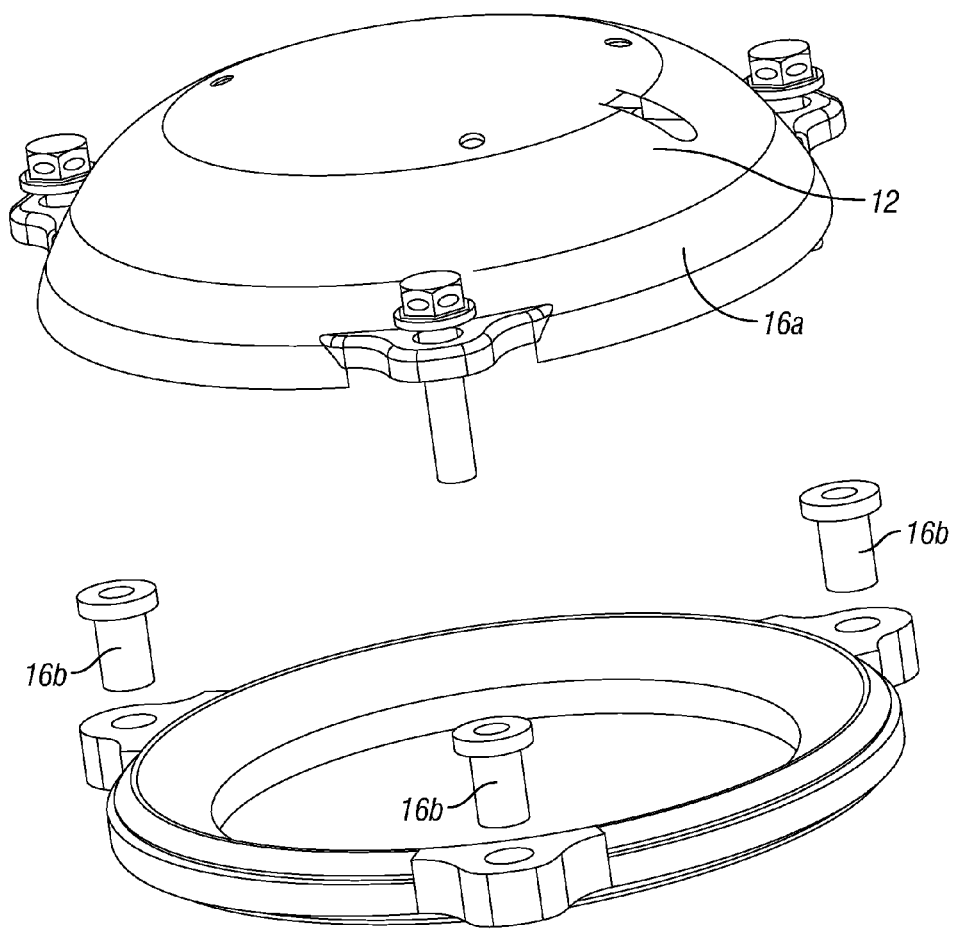
FIG. 12 illustrates an embodiment with the hubcap main body and the external insulation of the FIG. 11 embodiment.

FIG. 12 illustrates the hubcap main body 12 and the external insulation of the FIG. 11 embodiment.

Figure 13:
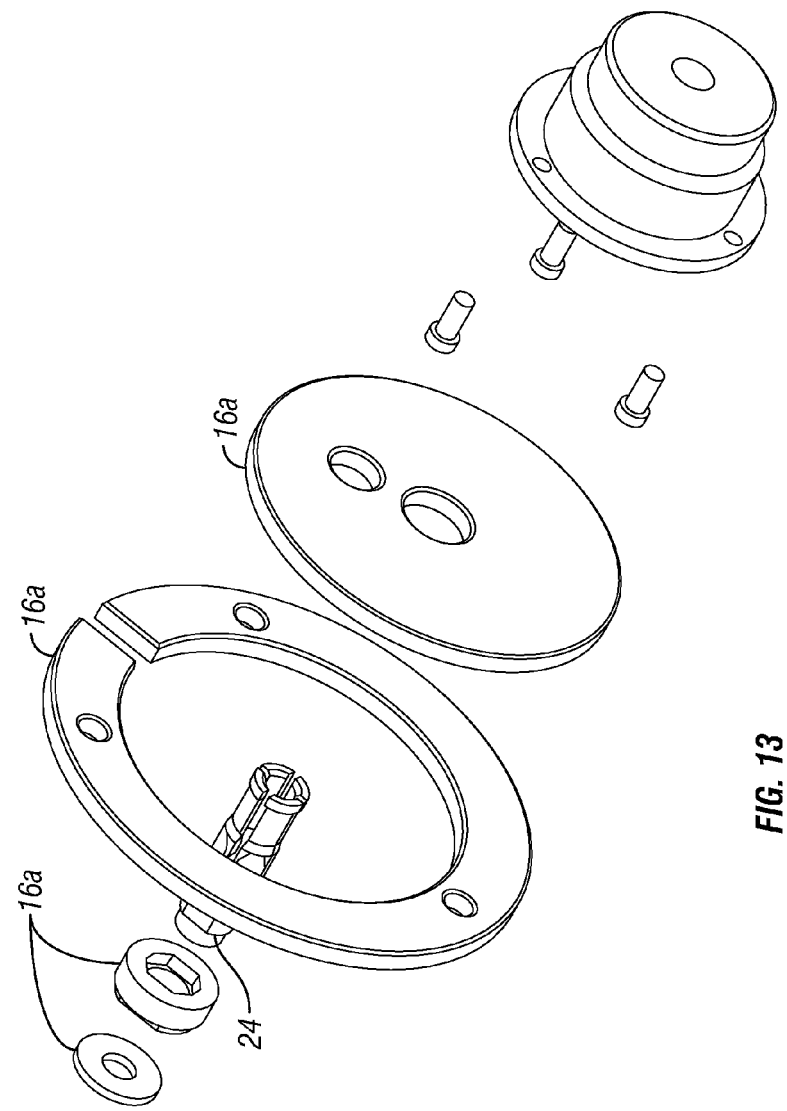
FIG. 13 illustrates another embodiment where only internal insulators are provided.
Figure 13:
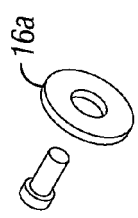

FIG. 13 illustrates another embodiment where only internal insulators 16a are provided. In this embodiment, the insulators 16a can be collet insulator 16a, and two additional insulators 16a configured as flat annular plates.

In one embodiment, the electronics 14 can include an ASIC (Application Specific Integrated Circuit) that conditions the signal generated by the pressure sensor 26 to obtain a first analog pressure output signal The conditioned output pressure signal is supplied through the electrical conduit over a first analog signal line to an ECU microprocessor. Alternately, the ASIC can generate a digital pressure output signal, in which case a digital signal line connects the ASIC to the microprocessor. The electrical conduit can optionally include contacts for power supply and ground connections (not shown)

Upon determination that the sensor 26 has malfunctioned, the microprocessor disables the host bus adapter (HBA) and generates a warning signal for the aircraft operator. The warning signal can be illuminating a light on the aircraft dashboard (not shown). The microprocessor generates an estimated pressure signal. The microprocessor can continuously monitor the pressure signal while the aircraft is being operated.

Other embodiments of the invention will be apparent to those skilled in the art from consideration of the specification and practice of the invention disclosed herein. It is intended that the specification and examples be considered as exemplary only, with a true scope and spirit of the invention being indicated by the appended claims.

The invention claimed is:

1. A thermal pressure measurement assembly coupled to a wheel of a tire, comprising:
    a housing configured to be fastened to a wheel face;
    an electronics enclosure positioned in an interior of the housing;
    electronics positioned in the electronics enclosure and configured to process a signal received from a remote sensor that measures the tire pressure and temperature;
    internal insulation positioned in the interior of the housing and comprising a bottom wall spaced apart from and parallel to the wheel face and a sidewall adjacent to the bottom wall wherein the sidewall of the internal insulation is located between the electronics enclosure and the housing and the bottom wall is located between the electronics enclosure and the wheel face; and,
    a thermally conductive spacer extending between the electronics enclosure and the interior of the housing opposite the wheel face.

2. The assembly of claim 1, wherein the internal insulation is of a quantity and position to provide that an interior temperature of the electronics enclosure does not exceed 125 degrees C.

3. The assembly of claim 1, further comprising a top cap spaced apart from and parallel to the bottom wall and enclosing the interior of the housing.

4. The assembly of claim 1, wherein the insulation has a thermal resistance greater than a thermal resistance of a material used for the housing.

5. The assembly of claim 1, wherein the internal insulation is in the form of a ring.

6. The assembly of claim 1, wherein the internal insulation retards a transfer of heat by radiation, conduction and convection, from the housing, the wheel, and brakes, into the electronics.

7. The assembly of claim 1, wherein at least a portion of the internal insulation is positioned between a housing main body and a housing cover.

8. The assembly of claim 1, wherein the remote sensor is a piezoresistive, piezoelectric or MEMS sensor.

9. The assembly of claim 1, wherein at least a portion of the internal insulation includes collet insulation.

10. The assembly of claim 1, wherein the remote sensor is coupled to a rim of the wheel and is electrically coupled to the electronics.

11. The assembly of claim 10, wherein the remote sensor is coupled to the electronics with a conduit.

12. The assembly of claim 1, wherein the electronics include an ASIC that conditions a signal generated by the remote sensor to obtain a first analog pressure output signal.

13. The assembly of claim 12, wherein the electronics include an analog signal line coupled to a corresponding pressure input port of an ECU microprocessor.

14. The assembly of claim 1, wherein the housing includes a top cap.

15. The assembly of claim 14, wherein the thermally conductive spacer is between the top cap and the electronics enclosure.

16. The assembly of claim 15, wherein the thermally conductive path passes through the thermally conductive spacer and the top cap.

17. The assembly of claim 1, further comprising external insulation positioned at an external surface of the housing.

18. The assembly of claim 17, wherein the internal and external insulation are of a quantity and position to provide that an interior temperature of the electronics enclosure does not exceed 125 degrees C.

19. The assembly of claim 17, wherein the internal insulation and external insulation are provided on a lower housing body element coupled to the housing via fasteners.

20. The assembly of claim 19, wherein the fasteners are thermally isolated from the electronics.

21. The assembly of claim 17, wherein the internal insulation includes, a ring, one or more insulator collets and an insulator positioned at an intermediate housing body element.

22. The assembly of claim 17, wherein the thermal pressure measurement assembly is positioned over an axial opening of the wheel.

\* \* \* \* \*